United States Patent [19]
Whitehead

[11] Patent Number: 5,823,177
[45] Date of Patent: Oct. 20, 1998

[54] PUMPLESS SOLAR WATER HEATER WITH ISOLATED PRESSURIZED STORAGE

[76] Inventor: John C. Whitehead, 3322 Biscayne Bay Pl., Davis, Calif. 95616

[21] Appl. No.: 585,095

[22] Filed: Jan. 16, 1996

[51] Int. Cl.⁶ ........................................................ F24J 2/04
[52] U.S. Cl. ...................................... 126/640; 126/350 D
[58] Field of Search ..................................... 126/361, 362, 126/350 R, 350 D, 642, 640, 638; 137/334, 335, 337

[56] References Cited

U.S. PATENT DOCUMENTS

| | | | |
|---|---|---|---|
| 787,909 | 4/1905 | Fox . | |
| 1,153,233 | 9/1915 | Knight | 126/361 |
| 1,849,266 | 3/1932 | Bentz | 126/362 |
| 2,276,136 | 3/1942 | Woolley | 137/122 |
| 2,486,833 | 11/1949 | Freund | 62/5 |
| 2,838,043 | 6/1958 | Bliss | 126/271 |
| 4,390,008 | 6/1983 | Andrews | 126/427 |
| 4,478,211 | 10/1984 | Haines | 126/433 |
| 4,501,262 | 2/1985 | Lyon | 126/437 |
| 4,590,992 | 5/1986 | Tamblyn | 165/104.19 |
| 4,911,228 | 3/1990 | Meshulam | 165/40 |
| 5,462,047 | 10/1995 | Kleinwachter | 126/639 |

OTHER PUBLICATIONS

Wang 1982 Solar Energy 29:6 p. 541 A "Once–Through" Solar Water Heating System.
Carvalho 1988 Solar Energy 41:1 p. 33 An Experimental Comparison of Op. Strategies for Sol. Water Sys.
Hollands 1989 solar Energy 43:2 p. 97 A Review of Low–Flow, Stratified–Tank solar Water Heating Sys.

*Primary Examiner*—Carl D. Price
*Attorney, Agent, or Firm*—Bradley P. Heisler

[57] ABSTRACT

A variable volume of solar heated water is stored in an insulated indoor tank. The hot water is indirectly pressurized by incoming cold water, which is accumulated separately to maintain a constant total volume without mixing. A small reduction in the total pressure of hot water is maintained, so that water can flow through a solar heat collector and into hot storage without pumps. In one preferred embodiment, the incoming cold water is accumulated in a tank (8) located above an insulated hot water tank (14). The tanks share a volume of compressed air, which freely passes through a pipe (12) connected between the tops of the two tanks. The transfer of compressed air permits incoming cold water to pressurize and displace hot water without mixing or heat loss. A control valve (24) is opened during sunny hours to permit flow from the upper tank (8), through a solar heat receiver (30), and into the lower tank (14). This collector flow is driven by the reduced elevation pressure of water in the lower tank (14), so no pump is needed. The valve controller (44) is simple because there is no possibility of sending heated water to a cooler collector, and flow stops by itself when the hot tank (14) becomes full. The air pipe (12) additionally serves as a bypass to deliver cold water after all hot water is used. Means are provided for freeze protection, replacement of lost air, and venting of excess air. The collector (30) may be located on the roof of a building, while the tanks (8, 14) are located lower in the building.

20 Claims, 3 Drawing Sheets

PUMPLESS SOLAR WATER HEATER WITH ISOLATED PRESSURIZED STORAGE

BACKGROUND

1. Field of Invention

The invention relates to heating water with an intermittent heat source such as the sun, and storing the heated water in a pressurized tank. More particularly, the invention is concerned with passing the water through a solar heat receiver without a pump, and then storing pressurized hot water in isolation to prevent mixing with cold water.

2. Discussion of Prior Art

Typically in the prior art, water is circulated during sunny hours from an insulated storage tank, through a solar heat collector on the roof of a building, and back to the same tank. Prior art circulation means include pumps and thermosiphons. Pumps are expensive, because their moving parts and seals must withstand elevated temperatures and thermal cycling for many years. Pumps can also be expensive to operate because they consume electrical energy which costs three times as much as thermal energy from fuel combustion. Thermosiphon circulation is sometimes used instead of a pump, in which case the heavy storage tank must be inconveniently located higher than the solar heat collector. The upper part of a building structure may need reinforcement to support such heavy tanks, especially considering earthquake loads.

A simpler type of prior art solar water heater eliminates the need for circulation by incorporating water storage into the heat collector. The sun shines directly on the surface of one or more tanks of water to be heated. These batch solar water heaters are heavy, which is a disadvantage for rooftop mounting. In addition, the water storage tank cannot be fully insulated because it must absorb heat from the sun. Therefore, expensive materials and apparatus such as coatings and vacuum jackets are used to mitigate the heat loss at night.

Variations in the prior art include closed loop solar water heating systems, which circulate a fixed quantity of a separate fluid through the solar collector, and a heat exchanger is used to transfer the heat to the water. Using a separate collector fluid offers advantages. The fluid can have a lower freezing temperature than water. There is no possibility of clogging narrow collector tubes with mineral precipitates from the water. It is acceptable to fabricate the collector from materials which might contaminate the water if exposed directly. The collector in a closed loop system may be operated unpressurized, which reduces mechanical stress and leakage potential. Drainback freeze protection simply requires stopping the circulation pump since a separate collector fluid may flow down to a small vented tank.

In spite of the potential advantages, closed loop solar water heaters have extra complexity and cost. The collector must be designed for higher temperatures because transferring heat through the additional fluid is inefficient. Both the collector fluid and the water must be caused to flow through a heat exchanger. To reduce the number of pumps or rooftop tanks, circulation through the solar collector is sometimes driven by percolating action of a working fluid having a low boiling temperature. However, an expensive specialized collector is required. Another way to avoid multiple pumps is to incorporate the heat exchanger into the hot water storage tank, but this requires a specialized expensive tank.

In all the prior art solar water heaters described above, incoming cold water is received directly into the hot storage tank. Dilution and cooling of stored hot water is a major disadvantage. Therefore, many prior art solar water heating systems use specialized expensive tanks to minimize mixing. The cold water is intended to remain at the lower end of the tank due to its higher density, which requires multiple dip tubes designed to direct their flows horizontally to maintain thermal stratification. If a backup heat source is used, it must be located at the top of the tank to avoid heating water which might later be heated by the sun. This prior art location for the backup heat source favors an electrical heating element instead of a burner, which results in a high energy cost.

Although specialized solar storage tanks may minimize direct mixing of heated water with incoming cold water, heat transfer between the two cannot be eliminated. For example, a layer of non-convecting water conducts heat more than 10 times faster than an equal thickness of non-convecting air, so the temperature transition zone is a significant portion of the tank volume. In addition, heat is conducted downward by tank walls and dip tubes, whereupon heated cold water rises and creates mixing currents.

Regarding the prior art, if most of a day's solar heated water is used during the evening, the remaining small amount of hot water loses its heat overnight to adjacent cold water. In order to provide solar heated water early in the morning, prior art systems must be sized to heat and store a volume of water which greatly exceeds the amount of daily use, thus increasing the cost of the apparatus. In addition, prior art solar collectors are often designed to provide excessive temperatures, so that the stored water remains acceptably hot after being diluted by cold water in the tank. Designing a solar heat collector to provide higher temperatures simply increases its cost due to specialized glazing, additional insulation, and special coatings.

Prior-art systems described above circulate relatively warm water through the solar collector or heat exchanger during the afternoon, which lowers collection efficiency at such times. Circulation of previously-heated water through the solar heat receiver late in the day or during cloudy periods can cool the water rather than heating it further. Pump controllers are therefore complicated, because it is not easy to determine when flow should stop. Multiple temperature sensors must be connected to a differential controller, for example.

The weaknesses resulting from returning solar heated water back to the same tank typically remain hidden. The quantity of heat lost through conduction and mixing, as well as the actual quantity of solar heated water produced and used, are not readily observable by users of prior art systems.

In less common prior art, the advantage of storing solar heated water in isolation has been appreciated. Single-pass, variable-volume, once-through systems achieve this by using the cold water supply pressure to drive flow through the collector. A variable volume of heated water is stored in a vented, unpressurized tank. The difficulty of delivering hot water from such a vented tank is a major disadvantage. Pressurized delivery requires a powerful high temperature pump, or a tank location many meters higher than the delivery point.

OBJECTS AND ADVANTAGES

Accordingly, an object of the present invention is to provide a solar water heating system having pressurized hot storage, in isolation from incoming cold water. Another object is to eliminate pumps, rooftop tanks, specialized storage tanks, special fluids, expensive materials, and complicated controllers. A related object is to minimize the size and cost of the solar heat collector by avoiding any need to generate extreme temperatures or to heat an excess amount of water. A further object is to provide a simple means for users to monitor the quantities of solar heated water produced and used, so that operation can be readily verified, and the benefits of the invention are appreciated. Regarding backup heat sources, compatibility with either a burner or an electrical heating element is also an object of the invention.

SUMMARY OF THE INVENTION

According to the present invention, a variable volume of pressurized hot water is stored in isolation from incoming cold water to avoid mixing and heat losses. A small reduction in the total pressure of stored hot water is maintained, so that incoming cold water flows through a solar heat collector and into hot storage without pumps whenever a control valve is open. As hot water is used, incoming water is accumulated to indirectly displace hot water and thereby maintain its pressure.

In a preferred embodiment, incoming cold water is accumulated in a tank located above the hot water tank. A fixed quantity of a compressed gas, preferably air, is shared between the tanks and communicates pressure. Air transfer permits incoming cold water to indirectly displace heated water as it is used. Solar heated water is delivered to the user at nearly full pressure, without contact with cold water.

Flow from the upper tank, through the solar heat collector, and into the lower tank, is driven by gravity whenever a control valve is open. Water passes through the collector only once, and retains its heat due to insulation on the hot water storage tank. Collector flow stops when the hot tank is full. There is no possibility of passing previously heated water through a cooler collector. Therefore collector efficiency is high, and a timer which opens the control valve during expected sunny hours is a sufficient controller. Although collector flow is driven by only a small differential elevation pressure, full pressure initially lifts water to the collector. The collector may therefore be located on the roof of a building, while the tanks are much lower.

Draining of the collector and its associated components provides freeze protection, and refilling replaces compressed air that either leaks or dissolves in the water. Sight tubes on the tanks permit an immediate determination of the quantity of solar heated water available, as well as verification that the system contains the correct amount of compressed air.

Figure 1:
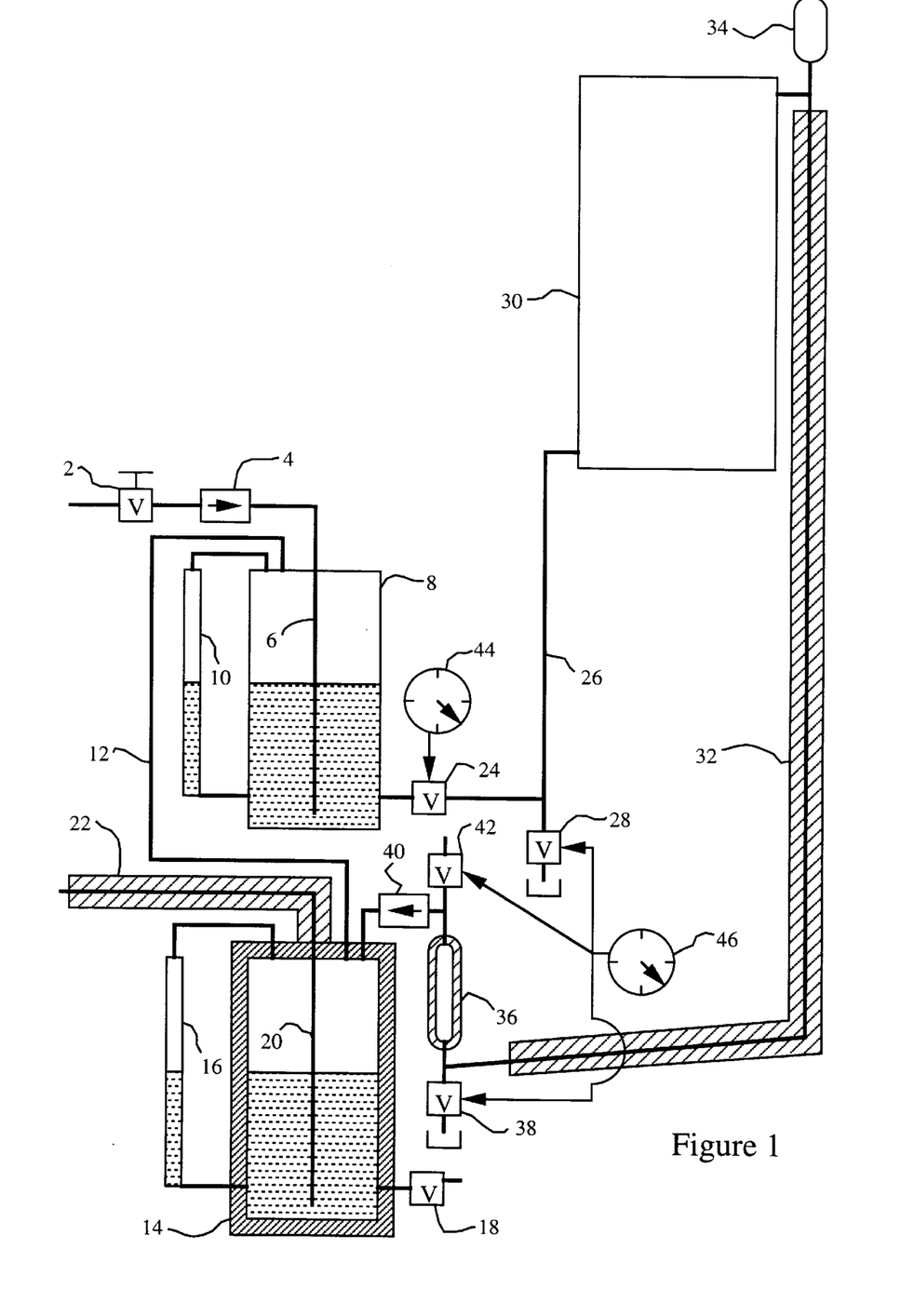
FIG. 1 shows a preferred embodiment of the invention, in which water flows from an accumulating tank, through a solar heat collector, and into a lower pressurized storage tank.

Description—Storage & Delivery—FIG. 1

A preferred embodiment of the invention is described in detail below with reference to FIG. 1, beginning with the water storage and delivery components. A manual cold water supply valve 2 is connected through a check valve 4, to a dip tube 6 in a cold water tank 8. The valve 2 receives incoming water at typically several times atmospheric pressure from a utility supply (not shown). The tank 8 is, for example, of the type commonly used in water heaters, except that it needs no insulation or high temperature capability. A sight tube 10 for indicating the water level is connected to upper and lower points on tank 8.

An air pipe 12 is connected from the top of tank 8 to the top of an insulated hot water tank 14, located below cold water tank 8. The insulated hot water tank 14 is preferably the kind of tank commonly used in water heaters. A sight tube 16 for indicating the water level is connected to upper and lower points on tank 14. As shown in FIG. 1, the tanks 8 and 14 have similar volumes and share slightly more than one tank volume of water. The tanks 8 and 14 also share a total quantity of compressed air which occupies slightly less than one tank volume. An automatic air vent valve 18, as known in the prior art, is connected to a low point on tank 14. A dip tube 20 in tank 14 is connected to an insulated hot water outlet pipe 22.

While not shown, the system may include additional manual valves for servicing as well as pressure relief valves for safety, as are typical in the prior art. The tanks 8 and 14 must have a pressure safety factor sufficient for operation with compressed air, which is known to be potentially more hazardous than pressurized water.

Description—Solar Passageway—FIG. 1

The components of the solar passageway are now described with reference to FIG. 1. A normally-closed control valve 24 is connected between a lower point on tank 8 and an outgoing pipe 26. A drain valve 28 is connected to the lowermost point of pipe 26. The upper end of pipe 26 is connected to the lower end of a prior-art solar heat receiver or collector 30. An insulated return pipe 32, connected to the upper end of collector 30, has an air trap 34 connected to its uppermost point. The air trap 34 is simply a small enclosed volume. The lower end of return pipe 32 is connected to the lower end of an insulated air makeup tank 36. A drain valve 38 is also connected to the lower end of tank 36. A check valve 40 is connected between the upper end of air makeup tank 36 and the top of hot water tank 14. The check valve 40 has a soft seat and a low cracking pressure, and it prevents flow of hot water or air out of tank 14. A vent valve 42 is connected to the top of air makeup tank 36.

The valves 24, 28, 38, and 42 are preferably solenoid valves which may be opened electrically. A timer 44 is connected to control valve 24. An additional timer 46 is connected to drain valves 28 and 38, and to vent valve 42. The timers 44 and 46 are daily timers having electrical switches. Control valve 24 is open during a predetermined period each day. Valves 28, 38, and 42 are open during a different predetermined period each day.

Operation—Storage & Delivery—FIG. 1

Operation of the preferred embodiment described above is now explained with reference to FIG. 1, beginning with water storage and delivery. During operation, the cold water supply valve 2 is open. The pressure in tanks 8 and 14 is substantially equal to the incoming water pressure. If the incoming pressure is reduced or interrupted, check valve 4 prevents reverse flow to avoid air loss. As hot water is drawn from hot water tank 14 through dip tube 20 and outlet pipe 22, the water level in hot water tank 14 falls. In order to maintain pressure equilibrium, air flows from cold water tank 8 through air pipe 12 into hot water tank 14. Incoming water flows through valves 2 and 4 and dip tube 6 into cold water tank 8. The incoming flow of cold water may lag the outflow of hot water due to small fluctuations in the incoming water pressure, but this lag is not detrimental.

After continued outflow of hot water from tank 14, the level in tank 14 may fall below the air vent valve 18, in which case excess air is eliminated through the valve 18. The accumulated cold water level may reach the top of tank 8. In this event, water overflows through air pipe 12, and into tank 14. This cold water bypass overflow occurs only after stored hot water is substantially depleted. The air pipe 12 is sized to permit adequate bypass flow, typically 2 cm in diameter for domestic use.

Within water, static pressure varies with elevation due to the high density. The compressed air in tanks 8 and 14 has a negligible density and therefore a substantially constant static pressure throughout. Therefore, static pressures at the liquid surface levels in tanks 8 and 14 remain equal. The static pressure in tank 14 is slightly lower than it would be if tank 14 were directly connected by a water filled pipe to tank 8 or to the utility water supply.

In technical terms familiar to those skilled in the art of fluid mechanics, the total pressure is the sum of static pressure and elevation pressure, which vary oppositely to each other as elevation varies within a dense fluid. Total pressure is constant within a continuous fluid. The air connection between tank 8 and tank 14 results in a slightly reduced total pressure in tank 14, because the elevation is lower while the air maintains a constant static pressure. At any particular elevation, hot water delivered through pipe 22 is at a slightly lower static pressure than cold water from the utility supply delivered to the same point. This slight pressure reduction of delivered hot water has not been a problem during prototype testing. Those skilled in the art may wish to include a check valve (not shown) along pipe 22 if there is any concern of reverse flow.

After installation of the system of FIG. 1, initial filling with incoming cold water is accomplished by opening valve 2. Incoming water fills tank 8 while air flows through pipe 12 and exits through vent valve 18. Subsequently, water overflows through pipe 12 into tank 14. After the water level in tank 14 reaches the air vent valve 18, remaining air is compressed into the top of tank 14. Additional air is subsequently introduced automatically as described below. Alternatively, an air compressor may be used to add air while drawing excess water through pipe 22. During initial installation of the solar water heating system, an air compressor may be connected to the inlet of check valve 40, for example. When a sufficient quantity of air has been introduced and excess water is drawn off, the water level in tank 14 falls to the air vent valve 18. Thus tank 8 is full of water and tank 14 is substantially empty, and the apparatus is ready for the first solar heating cycle.

Operation—Solar Passageway—FIG. 1

Operation of the solar passageway is now described with reference to FIG. 1. During non-sunny hours, control valve 24 is closed and check valve 40 is closed. Upon initial installation or after draining, air at atmospheric pressure occupies the solar water passageway consisting of pipe 26, collector 30, pipe 32, air trap 34, and air makeup tank 36. Immediately prior to and during solar heat collection, drain valves 28 and 38, and vent valve 42 are kept closed by timer 46.

At a predetermined morning time, timer 44 opens control valve 24. Pressurized cold water flows from tank 8, through control valve 24, pipe 26, and fills the solar collector 30. The air initially contained therein is compressed into return pipe 32, air trap 34, and air makeup tank 36. Water flow continues into return pipe 32, whereupon all air in pipe 32 either rises into air trap 34 or flows into air makeup tank 36.

After pressure equilibrium is reached in the solar passageway and all air bubbles rise, return pipe 32 is completely filled with water. Air makeup tank 36 contains some water and some compressed air. The air makeup tank 36 is sized to deliver an appropriate amount of air into tank 14, to replace air lost to dissolution and leakage. Tank 36 is not large, because it is sufficient to add just a small amount of air each morning. For example, tank 36 may contain 5 liters if tanks 8 and 14 each contain approximately 200 liters.

Those skilled in the art will appreciate that the heat receiver or collector 30 must not have an excessive internal water volume. Preferably, the volume in collector 30 is similar to or less than the volume of makeup tank 36. This ensures complete filling of the solar passageway and minimizes the required volume of the air trap 34.

As the solar passageway fills with water its total pressure approaches the total pressure of water in tank 8. Check valve 40 then opens due to the reduced total pressure in tank 14, and air in makeup tank 36 flows into hot water tank 14. Subsequently, water flows steadily from tank 8, through valve 24, pipe 26, collector 30, pipe 32, air makeup tank 36, check valve 40, and into tank 14. Thus cold water from tank 8 is heated by the sun and delivered to pressurized hot storage in tank 14, with no pump. As the water level in tank 8 falls and the water level in tank 14 rises, compressed air flows upward from tank 14, through air pipe 12, and into tank 8.

The elevation pressure which drives collector flow, equals the product of water mass density, gravitational acceleration, and the difference in elevation between the water level in tank 8 and the top of tank 14. The components of the solar water passageway must be sized to obtain an appropriate flow rate such that at least a full tank of water flows from tank 8 and into hot tank 14 during the sunny hours of each day. If flow through collector 30 is too rapid, the water obviously will not be adequately heated.

In order to minimize the size and actuation power of the control valve 24, it is preferred to oversize all other flow areas in the solar passageway. The valve 24 is thus restrictive and limits the collector flow. This preferred arrangement has additional advantages. The consequences of an external leak from the solar passageway are minimized, since the restrictive valve 24 is at the upstream end. In addition, it is an advantage to avoid restrictions along pipes for heated water, since precipitation of minerals can clog them. However, excessively oversized pipes in the solar passageway would waste water upon draining. Testing of the invention indicates that a 2 millimeter diameter flow restriction through valve 24 is sufficient to pass approximately 300 liters of water during sunny hours, with roughly 1 meter of elevation difference. The diameters of pipes 26 and 32, as well as tubes within collector 30, are typically 1 centimeter or greater.

As water is heated in collector 30, a small amount of dissolved air may be released. Air trap 34 must be sized to accept all air that rises to it during the day, which requires a volume of approximately 1 liter to heat 300 liters of water.

Water may be drawn through outlet pipe 22 at any time during the day or night, including simultaneously with flow through collector 30. The outflow of hot water through pipe 22 is rapid but sporadic, while the flow through collector 30 is slow but continuous during the day. Therefore, the water level in hot water tank 14 typically falls in relatively rapid steps, but rises over the course of the day. The quantity of water which can be heated and drawn during sunny hours through pipe 22 is limited only by the size of collector 30 and the flow therethrough. The volumes of the tanks 8 and 14 merely limit the quantity of heated water stored for delivery during non-sunny hours.

Due to evening and early morning hot water use, tank 8 is substantially full of cold water in the morning while tank 14 is substantially full of air. In the late afternoon, tank 8 is full of air while tank 14 is full of solar heated water. Sight tubes 10 and 16 can be used to monitor operation. For example, sight tube 16 may be viewed immediately before and after using hot water, to determine the quantity delivered from storage. If the morning level in sight tube 16 is low, some users may wish to take note and wait for fresh solar hot water.

Regular viewing of the sight tubes 10 and 16 at the beginning and end of each solar heating day indicates whether and how often the water levels reach their extremes, i.e. whether the system is properly sized for the quantity of hot water used. Ideally, the water levels cycle fully each day and just barely reach their extremes. In addition to the sight tube levels, the sounds which the system makes can be used to verify proper operation. As solar heated water falls from check valve 40 into tank 14, a faint trickle is heard. In the event of excessive demand, the overflow of water through air pipe 12 results in a louder flowing sound.

After tank 14 becomes completely full of solar heated water during the late afternoon, the hot water level in tank 14 rises part way into air pipe 12, up to the water level in tank 8. This event equalizes total pressure and naturally stops flow through collector 30 if control valve 24 has not yet been closed by timer 44. Alternatively, if there is excess air in tanks 8 and 14, the water level in tank 8 may fall to the level of control valve 24. Air enters the solar passageway and stops the flow. This event leads to eliminating excess air through the drain valves.

At a predetermined evening time, timer 44 closes control valve 24. Timer 46 subsequently opens drain valves 28 and 38, and vent valve 42. The resulting reduction of pressure in the solar passageway closes check valve 40. Draining is initially aided by the compressed air in trap 34. Some water in pipe 26 and collector 30 drains through valve 28. Water in pipe 32 and air makeup tank 36 drains through valve 38. Finally, air at atmospheric pressure enters the solar passageway through valves 28 and 42, while remaining water drains through valve 38.

After a predetermined time sufficient to ensure complete draining, timer 46 closes valves 28, 38, and 42. Testing indicates that a fraction of an hour is sufficient for draining, if valves 28, 38, and 42 have flow diameters of 2 mm. Thus all electrical valves shown in FIG. 1, including valve 24, may be identical. After draining, air at atmospheric pressure fills the entire solar passageway, consisting of pipe 26, collector 30, pipe 32, trap 34, and air makeup tank 36. Thus, automatic draining provides freeze protection for the collector 30 and outdoor pipes, as well as adding air to the system upon refilling of the solar passageway as explained above. If freeze protection is not required, only the air makeup tank 36 needs to be drained, in which case valve 28 may not be needed.

From the foregoing explanations, those skilled in the art will appreciate the importance of avoiding local high and low points along pipes 26 and 32 as well as along tubes within collector 30. Any additional high points require air traps, and any additional low points require drain valves. Solar heat collector 30 may be located at any elevation with respect to tanks 8 and 14, except that the top of collector 30 must have a lower elevation than the water level in the city water tower, or the equivalent elevation of the incoming water pressure. If it is desirable to locate the solar collector 30 lower than the tanks 8 and 14, the air trap 34 would be relocated to the highest point along the pipe 26, or possibly eliminated as will be understood by those skilled in the art. Similarly, drain valves would be located at all low points.

Those skilled in the art of solar water heating systems will appreciate the absence of any outdoor moving parts, wires, sensors, or expensive apparatus. Although the embodiment of FIG. 1 has numerous components, only readily available tanks, pipes, fittings, and valves are required to implement the present invention having pumpless collector flow with subsequent isolated and pressurized storage of solar heated water.

Although the system requires a total tankage volume greater than the volume of stored heated water, tanks 8 and 14 may individually be smaller than a prior-art solar storage tank in which incoming cold water dilutes some of the solar heated water. Also, it is preferred to locate tank 8 directly above tank 14, so the floor space occupied within the building is equal to that of one tank alone.

Variations—FIG. 1

A number of possible variations to the preferred embodiment of FIG. 1 are now considered. Obviously, a backup heater may be connected along hot water outlet pipe 22. Alternatively, a backup heat source may be incorporated into the lower end of tank 14. Air vent valve 18 ensures that such a burner or electric heating element is always exposed to water rather than air. In order to provide a larger water volume always in contact with such a backup heat source, the volume of tank 14 could be greater than that of tank 8. The air vent valve 18 would then be raised to be compatible with a larger minimum water volume in tank 14. The location of a backup heater at the bottom of tank 14 is compatible with a burner which provides combustion heat at a low cost. This is an advantage over the prior art, wherein expensive electricity is normally used for backup heaters located at the top of solar storage tanks.

Those skilled in the art will appreciate that vent valve 42 might be eliminated if drain valve 38 is sufficiently large to permit air bubbles to rise through valve 38 during draining. Alternatively, valve 42 could be replaced by a non-electrical vacuum relief valve or a sensitive check valve with a low cracking pressure. Such a passive replacement for valve 42 must remain closed with equalized pressure to permit filling of air makeup tank 36 without air leakage. Such a replacement also must open with only minimal suction to permit draining.

Although automatic draining, air makeup, and venting of excess air are valuable and preferred features of the invention, basic operation without these features is possible to reduce cost and complexity. Thus, valves 28, 38, and 42, as well as air makeup tank 36, and vent valve 18, could be eliminated. In such a simplified installation, occasional freeze protection in warm climates requires manual drain valves or pipe disconnections. A bucket could be used instead of drain plumbing for annual draining, for example. Without daily automatic air makeup, it is simply necessary to occasionally introduce compressed air through an auxilliary valve, which may be accomplished with a manual pump. A simplified installation could have only one sight tube, in which case the daily extremes in its level would provide sufficient information.

Air losses could be eliminated by containing the compressed air or another gas within a bladder in each of tanks 8 and 14. The air pipe 12 would connect the two air bladders.

A separate water bypass pipe with an appropriate bypass valve would be required to permit cold water to flow directly from tank 8 to tank 14.

In FIG. 1, the various pipes and valves are shown to be separately connected to the tanks for clarity of the drawing. Those skilled in the art will appreciate that some pipes may be connected together to reduce the required number of tank ports. A single tank port may even be used for both a dip tube and a connection to the tank top, with a concentric arrangement. Another example is that the air vent valve 18 may be connected to the sight tube 16, if a tank side port is not available at the desired elevation of valve 18. In many cases it is possible to replace dip tubes with low tank ports and vice versa, if convenient.

In private water systems having well pumps that operate intermittently, a cold water accumulator tank with air pressurization is normally used. The upper tank 8 of the present invention could additionally serve this purpose. In particular, the well pump would intermittently deliver water through check valve 4, and cold water for domestic use would be drawn from tank 8. An appropriate float valve would be helpful to prevent air loss through such a cold water delivery pipe. In such a private water system, integrating the cold pressure tank and water heater with the present invention substantially equalizes hot and cold delivery pressures, while providing effective solar water heating without an extra cold water tank. For any source of pressurized incoming water, it is notable that the embodiment of FIG. 1 provides an emergency supply of pressurized water in the event that the incoming supply is interrupted.

In a less-preferred variation of the invention, accumulating cold water could be avoided, by maintaining a large fixed volume of compressed air in communication with the insulated hot water storage tank. The hot storage pressure would always be less than the cold water supply pressure, in order to permit flow through the solar collector without a pump. In such a variation, the pressure of stored heated water would vary substantially. In order to keep the variations within acceptable limits, e.g. a factor of 2, the extra tankage volume for compressed air would exceed the volume of the cold water tank 8 in FIG. 1.

In FIG. 1, the cold water tank 8 may absorb heat from its surroundings, which can enhance the effectiveness of the invention. The cold water tank 8 could even be located to receive sunshine. An alternate embodiment which uses this effect is described below.

Figure 2:
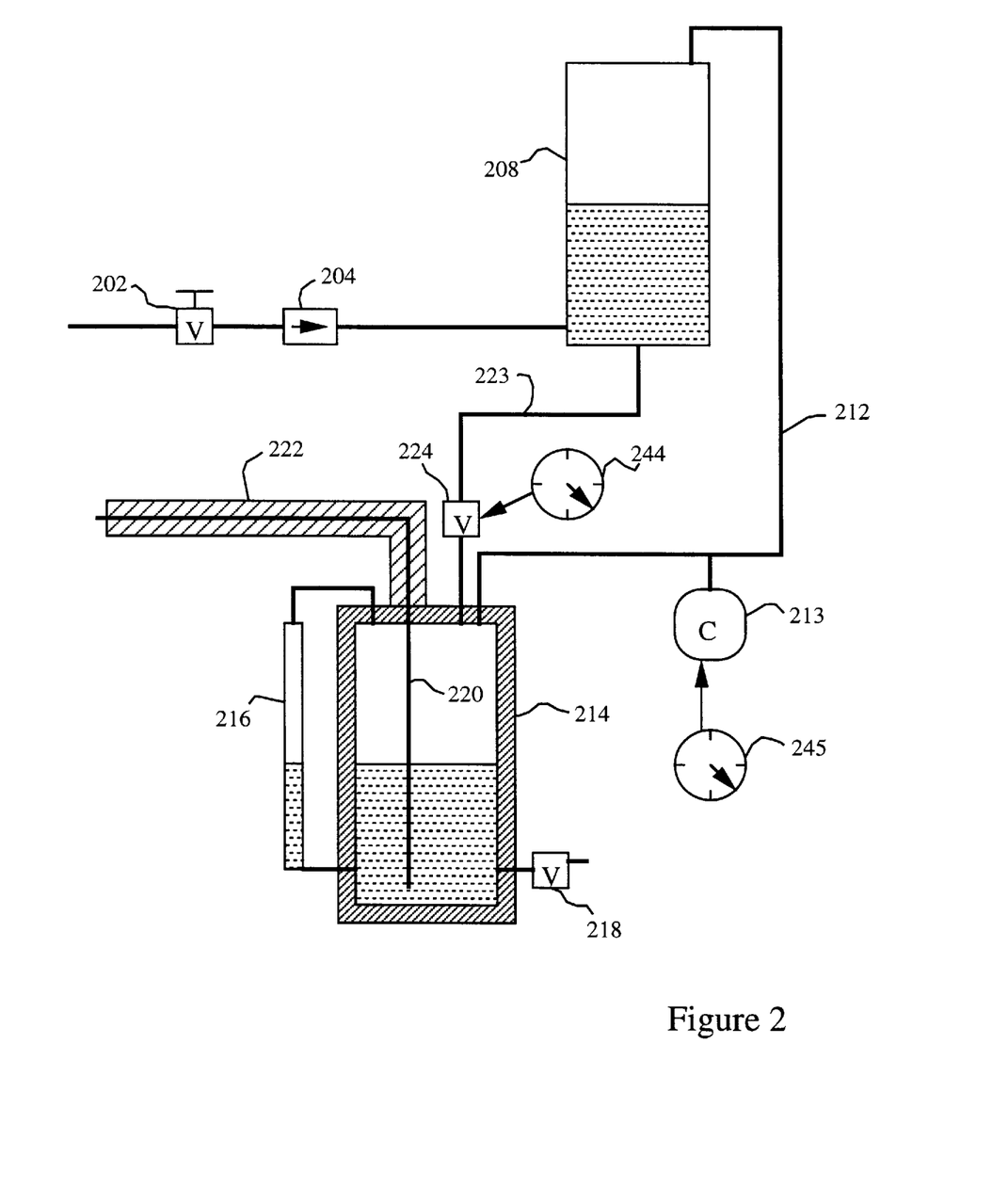
FIG. 2 shows an alternate embodiment in which the upper tank is a batch solar heater.

Alternate Embodiment with Batch Heater as Upper Tank—FIG. 2

An alternate embodiment of the invention which combines the solar collector with the upper tank is now described with reference to FIG. 2. The last two digits of numerals correspond to their similar counterparts in FIG. 1. In FIG. 2, a cold water supply valve 202 is connected through a check valve 204 to a batch solar water heater 208. Batch heater 208 is both a tank and a solar collector, and includes one or more tanks and glazing as known in the prior art. However, expensive means such as vacuum jackets used in the prior art to prevent nightly heat loss from batch heater 208, are not required according to the present invention.

An air pipe 212 is connected to the top of batch heater 208. An air compressor 213 is connected to a point along air pipe 212. Compressor 213 is preferably a small, quiet, low power unit. The lower end of air pipe 212 is connected to the top of an insulated hot water storage tank 214. Tank 214 may be located indoors whereas batch heater 208 is outdoors at a higher location, such as on a roof. A sight tube 216 is connected to tank 214. An air vent valve 218 is connected to tank 214 near its lower end. A dip tube 220 within tank 214 is connected to an insulated hot water outlet pipe 222. A water passageway pipe 223 is connected to a low point on batch heater 208. A control valve 224 is connected between pipe 223 and the top of hot water tank 214. A timer 244 is connected to control valve 224. A timer 245 is connected to air compressor 213. Batch heater 208 and hot water tank 214 have similar volumes and they share approximately one tankful of compressed air. To permit rapid flow through pipe 223, control valve 224 is substantially larger than its counterpart valve 24 in the embodiment of FIG. 1.

Operation of the FIG. 2 embodiment is now described. As hot water is drawn from hot water tank 214 through outlet pipe 222, compressed air flows from batch heater 208, through air pipe 212, and into tank 214. As a result, incoming cold water enters batch heater 208 through valves 202 and 204. If the water level in batch heater 208 rises to the top, overflow through air pipe 212 occurs. In the morning, batch heater 208 is substantially full of cold water and tank 214 is substantially full of air. During the day, batch heater 208 remains full of water and air remains in hot water tank 214. The water in batch heater 208 is heated by the sun. Daytime hot water is supplied from the top of batch heater 208, through pipe 212, tank 214, dip tube 220, and outlet pipe 222. The quantity of heated water which may be drawn during the day is limited only by the sunlit area of batch heater 208. If large amounts of solar heated water are used during the day, then insulation (not shown) may be added to pipe 212. The volumes of batch heater 208 and tank 214 are sized for the quantity of hot water to be stored for use during non-sunny hours.

At a predetermined time in the late afternoon, timer 244 opens control valve 224. Heated water in batch heater 208 flows rapidly through water passageway 223, control valve 224, and into hot water tank 214. Simultaneously, compressed air in tank 214 flows through pipe 212 and into batch heater 208. After a sufficient time, preferably a fraction of an hour, for all water in batch heater 208 to flow into tank 214, timer 244 closes control valve 224. Solar heated water is now stored indoors in insulated tank 2 14, and nightly heat loss is avoided. As hot water is used from tank 214 during evening, night, and early morning hours, air moves through pipe 212 while batch heater 208 accumulates cold water.

Timer 245 periodically activates air compressor 213 for several minutes, in order to replace the small quantity of air which is lost to dissolution and leakage. This automatic air makeup may occur at any time, and may be simultaneous with operation of valve 224, for example. The quantity of added air need not be controlled precisely, as any excess air is released through air vent valve 218. Air compressors typically have outlet check valves, which prevents air loss from pipe 212 through compressor 213. Accessory features such as a backup heat source, pressure relief valves, servicing valves, and drain valves may be incorporated into this alternate embodiment, as will be appreciated by those skilled in the art.

As with all batch type solar water heaters, this alternate embodiment of the invention is appropriate in climates where freeze protection is not required. Relative to prior-art batch heaters, the FIG. 2 embodiment offers two major advantages. The first is fully insulated indoor storage of heated water to avoid heat loss at night. The second advantage is that dilution of stored hot water by incoming cold water is avoided. Those skilled in the art will appreciate that batch heater 208 may therefore be relatively simple and low in cost, while system effectiveness is improved over the prior art. The FIG. 2 embodiment retains one disadvantage of prior-art batch heaters, namely the heavy rooftop tank.

Figure 3:
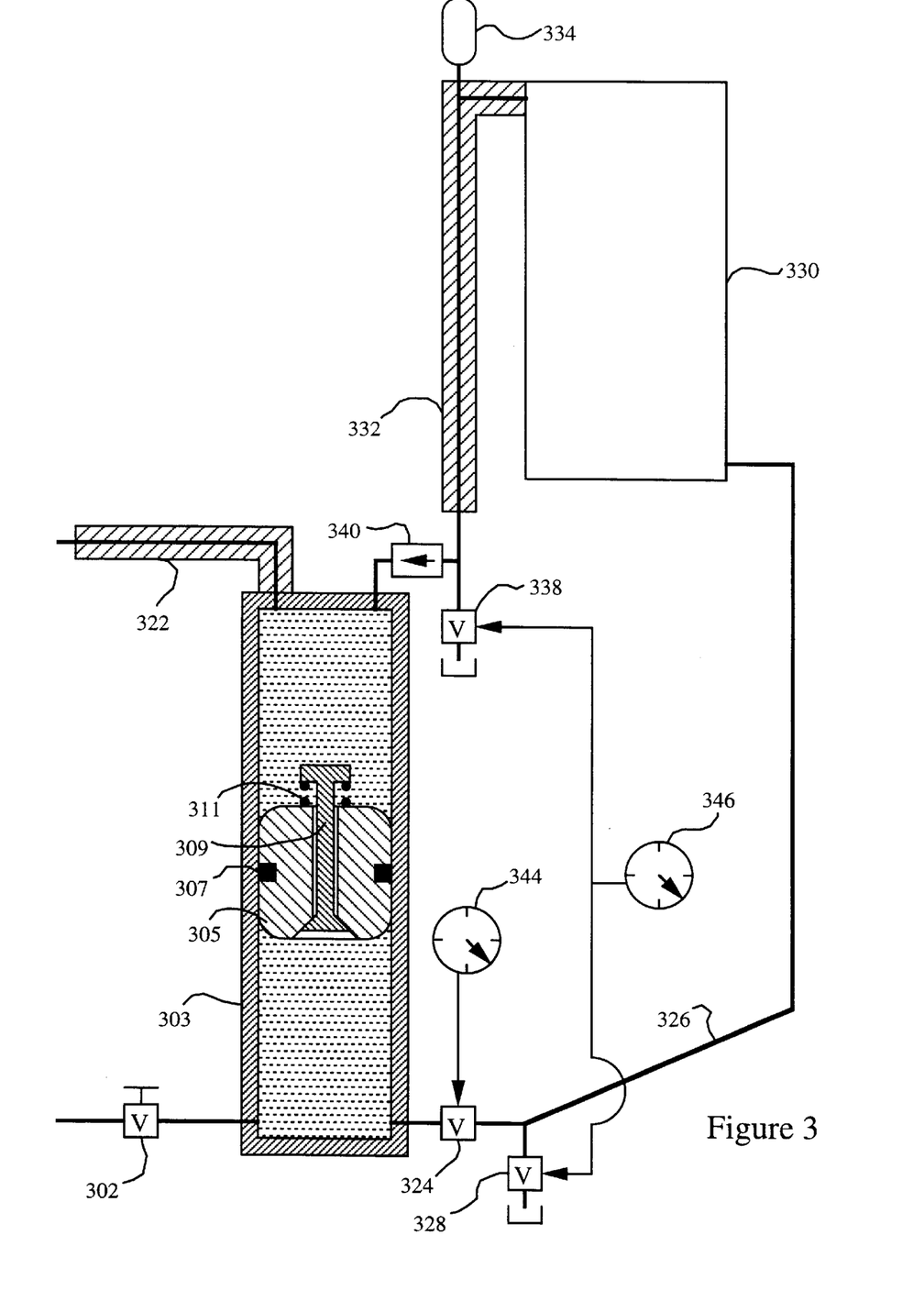
FIG. 3 shows an alternate embodiment which uses a single tank having a piston.

Alternate Embodiment With Piston Tank—FIG. 3

An alternate embodiment having a piston tank is now described with reference to FIG. 3. The last two digits of numerals correspond to their similar counterparts in FIG. 1. In FIG. 3, a cold water supply valve 302 is connected to the lower end of an insulated vertical tank 303. A heavy piston 305 having a seal 307 is free to move vertically within tank 303. The piston is preferably made of a material having a high density and a low thermal conductivity. The heavy piston 305 is made of concrete, for example. A valve 309 within piston 305 is normally held closed by a spring 311. An insulated hot water outlet pipe 322 is connected to the top of tank 303.

Tanks having pistons with bypass valves are described in the prior art. The tank may have a removable cover (not shown) to permit access to these internal parts, as known in the prior art. Tank 303 is preferably tall and narrow, which reduces lengthwise heat conduction, while also minimizing the occupied floor space. Tank 303 is preferably fabricated from large stainless steel tube, for example, which minimizes heat conduction in the wall due to the low thermal conductivity of this material.

The solar water passageway shown in FIG. 3 is now described. A normally-closed automatic control valve 324 is connected to a lower point on tank 303 and to outgoing pipe 326. A drain valve 328 is connected to pipe 326 at its lowermost point. The upper end of pipe 326 is connected to the lower end of a solar heat receiver, collector 330. An insulated return pipe 332 is connected to the upper end of collector 330. Pipe 332 has an air trap 334 connected to its uppermost point. The lower end of return pipe 332 is connected to a drain valve 338 and to a check valve 340. Check valve 340 is in turn connected to the top of insulated tank 303. A timer 344 is connected to automatic control valve 324. A timer 346 is connected to drain valves 328 and 338.

Operation of the FIG. 3 embodiment is now described. After initial installation, cold water supply valve 302 is opened, which fills tank 303, causing piston 305 to rise. A hot water faucet or other valve (not shown) is opened to permit air to escape through hot water outlet pipe 322. As piston 305 rises, valve 309 ultimately is pushed open by the top of tank 303. The tank 303 becomes completely filled with water and the apparatus is ready to begin the first solar heating cycle.

Operation of the solar passageway is similar to that of the FIG. 1 embodiment. In FIG. 3, timer 344 opens control valve 324 during sunny hours. Cold water from the lower end of tank 303 flows into pipe 326, collector 330, and pipe 332. Air which is initially within these components rises and is compressed into air trap 334. Subsequently, the weight of heavy piston 305 causes water to flow steadily from the lower end of tank 303, through collector 330, and into the upper end of tank 303. As the piston 305 falls, the volume of stored hot water increases while the volume of accumulated cold water decreases.

In precise terms familiar to those skilled in the art of fluid mechanics, the high material density of heavy piston 305 results in a difference in total pressure of the water above and below the piston. Relative to the incoming cold water pressure at the lower end of tank 303, the static and total pressures above the heavy piston 305 are less than they would be if the piston is replaced by water.

Hot water may be drawn through outlet pipe 322 at any time of the day or night, so piston 305 rises intermittently in steps. Hot water is delivered at a slightly reduced pressure relative to the utility cold water supply, depending on the height and density of piston 305. Whenever all solar heated water is depleted, cold water is delivered through bypass valve 309 and pipe 322. A backup heater (not shown) may obviously be included with this embodiment.

Regular nightly draining of the solar passageway through valves 328 and 338 prevents freezing. Alternatively, the solar passageway may be drained only when temperatures are very low, in which case an appropriate prior-art controller would actuate drain valves 328 and 338.

The primary advantage of the FIG. 3 embodiment is that compressed air is not used. Therefore, the total tankage volume is reduced, air losses are avoided, and air makeup and venting apparatus is not required. A potential disadvantage of the FIG. 3 embodiment is that the piston tank has internal moving parts and is relatively expensive.

A variation of the FIG. 3 embodiment could use a large spring to apply force to a short (i.e. thin) piston, instead of using the weight of a tall (i.e. thick) piston. Such a spring would result in a step change in both static pressure and total pressure across the spring-loaded piston. Another alternative would be a moving separator lighter than water, in which case cold water would be stored above it with heated water below it. An air-filled piston, for example, would rise to drive collector flow. Valve 309, as well as the connections to the solar passageway, would be reversed. One advantage of such a lightweight piston alternative is that a burner at the lower end of tank 303 could provide backup heat, in which case a lower piston stop would ensure a minimum water volume adjacent to the burner. An inflatable seal may be used between the piston and the tank wall. For either a heavy or a lightweight piston, alternatives to the sliding seal 307 include deformable membranes such as a diaphragm or bellows within the tank. A thick heavy diaphragm could even be used instead of a piston, or a double diaphragm with air between the layers would operate similarly to an air-filled piston. A highly elastic deformable diaphragm or bladder could also replace the piston and seal. The elastic force of such a diaphragm would result in a pressure difference across it, in order to drive collector flow.

Variations of the Invention

Several additional variations which may be used with one or more of the above described embodiments are now considered. The 24-hour clock timers shown in the drawings are preferred controllers because they are inexpensive, and are easily understood and maintained. However, drain valves could be actuated by an interval timer triggered by the control valve clock timer, or the pair of timers could be replaced by a single digital timing circuit. Timers or timing circuits require no outdoor sensors or wires, but may require occasional resetting.

Those skilled in the art will appreciate that controllers which sense sunlight or temperature can alternatively be used. For example, the valve 24 or 324 could be directly powered by a photovoltaic module, or a temperature switch could be located within the solar heat receiver and connected in series with the control valve. The flow could thus stop temporarily during cloudy conditions, or if an excessive flow rate cools the collector. In extremely cold climates where there is potential for freezing during the day, temperature sensitive draining would provide better freeze protection than evening draining by a timer. A temperatureactivated valve in parallel with the control valve 24 or 324 could be used to increase the collector flow rate in the event that excessively hot water is being delivered to tank 14 or tank 303. Similarly, control valve 224 could be opened earlier on days when excessive temperatures are approached. In general, time, temperature, and sunlight level can be used in combination by a sophisticated controller.

Various fail-safe means known to those skilled in the art of electrical circuitry may be included to increase the reliability of the invention. For example, a battery-powered circuit could actuate drain valves in the event of an electrical power interruption. Another example of a fail-safe feature is an electrical relay interlock which prevents simultaneous actuation of the control valve and drain valves. The normally-closed drain valves described with the preferred embodiments may be identical to the control valve, and they require electrical power for only a fraction of an hour each day. Normally-open drain valves could be used instead, if it is acceptable to continuously power them closed during sunny hours. This alternative would simplify the controller and inherently provide freeze protection during power interruptions.

Those skilled in the art of solar water heating are familiar with numerous methods for freeze protection, many of which could be adapted to the present invention. For example, a prior-art drain-down valve may be used. Instead of draining, incoming water may be permitted to slowly flow through the solar passageway to displace water that is close to freezing.

The solar heat receiver, through which water flows according to the present invention, may be any device or part thereof which directly or indirectly receives solar heat. In one such alternative, a heat exchanger located above a collector would permit thermosiphon flow of a special collector fluid as is known in the prior art. The heat exchanger would thus receive solar heat, while water flow through the heat exchanger would be accomplished according to the present invention. If such a heat exchanger is located inside an insulated attic, water draining would not be required for freeze protection. For water heating during the winter, the invention could be used to send water through an alternative heat receiver such as a heat exchanger within a wood burning stove.

To eliminate electrical operation entirely, the control valve could be replaced by a temperature sensitive mechanical valve integrated into one of the above heat receivers. This variation would be most compatible with the freeze-proof option described above, since outdoor moving parts are undesirable, and also because such a control valve would be less compatible with draining.

Those skilled in the art may wish to replace air trap 34 or 334 with a prior-art air vent valve similar to vent valve 18. The trap is presently preferred, to avoid having moving parts outdoors exposed to the elements. Those skilled in the art of solar water heating systems will appreciate that a rooftop air trap may be considered unsightly by customers. For this reason, the air trap volume may be incorporated inside an attractive solar collector enclosure. An alternative air vent, without moving parts, could incorporate a hydrophobic membrane which is impervious to pressurized water but freely passes air.

Those skilled in the art may choose to use alternative means for air makeup. For example, an air compressor as shown in FIG. 2, could replace the air makeup tank of FIG. 1.

Another possibility for air makeup is a venturi device which uses a high water flow velocity to draw atmospheric air into the system.

It is possible that the hot storage reservoir of any embodiment would contain cooled water in the event of reduced hot water use during previous days. Although such an occurrence would be unlikely or only occasional, means could be provided to automatically drain excess water from the hot storage reservoir early on a sunny day, so that a full tank of water may be freshly heated.

Summary, Ramifications, and Scope

From the descriptions of the above preferred embodiments, the reader will see that the solar water heating system of the present invention is superior to prior-art systems, because it provides variable-volume pressurized storage of solar heated water in isolation from cold water, while avoiding pumps and other specialized components. The suggested apparatus in the descriptions should not be construed as limitations on the scope of the invention, but rather as examples of preferred embodiments. The essence of the invention includes variable volume, isolated storage of heated water at a substantial pressure, with a slight reduction in total pressure, to permit pumpless flow of incoming water through a heat receiver.

The features of the apparatus described for filling, draining, air management, monitoring, and control should particularly not be construed as limitations on the scope of the invention. Those skilled in the prior art of solar water heaters are likely to suggest improvements to these features upon practicing the invention. Accordingly, the scope of the invention should be determined not by the embodiments illustrated, but by the appended claims.

I Claim:

1. An apparatus for solar water heating, comprising:
   a. a first tank having a cold water inlet, a water outlet, and a first gas port, said first tank having means to hold fluid therein at a pressure elevated above atmospheric pressure;
   b. a second tank having a hot water inlet, a hot water outlet, and a second gas port, said second tank having means to hold fluid therein at a pressure elevated above atmospheric pressure, said second tank being separate from said first tank, and said second tank being located at a lower elevation than said first tank;
   c. a gas pipe connected between said first gas port and said second gas port, such that gases can flow between said first tank and said second tank;
   d. a substantially fixed quantity of compressed gas contained within said first tank and said second tank, said substantially fixed quantity of compressed gas occupying a total volume exceeding half the volume of said first tank;
   e. a water passageway connected between said water outlet of said first tank and said hot water inlet of said second tank;
   f. means to heat by solar radiation water located between said cold water inlet of said first tank and said hot water inlet of said second tank;
   g. a control valve on said water passageway, said control valve having means for closing said control valve at night.

2. The apparatus of claim 1, further comprising means for venting any excess amount of said compressed gas from said second tank, said means for venting being responsive to a predetermined low water level in said second tank.

3. The apparatus of claim 2 wherein said compressed gas is compressed air, further comprising means for compressing atmospheric air into said tanks.

4. The apparatus of claim 1, wherein said means to heat comprises a solar heat receiver having a receiver inlet and a receiver outlet, said solar heat receiver being connected in series with said water passageway, said solar heat receiver being selected from the group consisting of solar collectors and solar heat exchangers.

5. The apparatus of claim 4, further comprising a device selected from the group consisting of air traps and air vents, connected to an uppermost point of said water passageway.

6. The apparatus of claim 4, further comprising at least one drain valve connected to said water passageway at a low elevation.

7. The apparatus of claim 6, further comprising a third tank connected in series with said water passageway, such that said third tank receives atmospheric air upon draining of said water passageway, and said atmospheric air flows into said second tank upon refilling of said water passageway with water.

8. The apparatus of claim 1, wherein said first tank is a solar heat receiver.

9. An apparatus for heating pressurized water with an intermittent heat source, and providing pressurized heated water whenever needed, comprising:
   a. first means for accumulating a first variable quantity of incoming water at a first total pressure above atmospheric pressure, said first means having a cold water inlet and a water outlet, and said first total pressure being substantially equal to the total pressure of said incoming water;
   b. second means for storing a second variable quantity of heated water in isolation from said incoming water at a second total pressure above atmospheric pressure, said second means having a hot water inlet and a hot water outlet;
   c. third means for passively applying a majority part of said first total pressure to said heated water in said second means, said third means communicating between said first means and said second means, said third means being operative over wide ranges of said variable quantities, said third means having means for minimizing heat transfer and water flow through said third means, and said second total pressure being substantially equal to said majority part of said first total pressure;
   d. fourth means for passively maintaining said second total pressure at a slight pressure reduction below said first total pressure regardless of whether water is flowing through said hot water outlet, said slight pressure reduction being maintained over wide ranges of said variable quantities;
   e. fifth means for passively keeping said first variable quantity of incoming water and said second variable quantity of heated water in an opposite volumetric relationship with a substantially constant sum over wide ranges of said variable quantities;
   f. a water passageway connected between said water outlet of said first means and said hot water inlet of said second means;
   g. sixth means for transferring heat from said intermittent heat source to water located between said cold water inlet of said first means and said hot water inlet of said second means;
   h. a control valve on said water passageway, said control valve having means for closing said control valve during periods when said intermittent heat source is inactive.

10. The apparatus of claim 9, wherein said intermittent heat source is solar radiation, said first means comprises a first tank having a first gas port, said second means comprises a second tank having a second gas port, said third means comprises a gas pipe connected between said first gas port and said second gas port and said majority part of said first total pressure is static pressure, said fourth means comprises a fixed location of said second tank at a lower elevation than said first tank and said slight pressure reduction is a reduction in elevation pressure, said fifth means comprises a large substantially fixed quantity of compressed gas contained within said tanks and substantially fixed sizes of said tanks, and said sixth means comprises a solar heat receiver connected in series with said water passageway.

11. The apparatus of claim 9, wherein said intermittent heat source is solar radiation, said first means comprises a first tank within a batch solar water heater having a first gas port, said second means comprises a second tank having a second gas port, said third means comprises a gas pipe connected between said first gas port and said second gas port and said majority part of said first total pressure is static pressure, said fourth means comprises a fixed location of said second tank at a lower elevation than said first tank and said slight pressure reduction is a reduction in elevation pressure, said fifth means comprises a large substantially fixed quantity of compressed gas contained within said tanks and substantially fixed sizes of said tanks, and said sixth means comprises means for exposing said first tank within said batch solar water heater to said solar radiation.

12. The apparatus of claim 9, wherein said first means comprises a variable volume lower portion of a tank, said second means comprises a variable volume upper portion of said tank, said third means comprises a vertically moveable separator having low heat transfer properties within said tank, said separator defining said lower portion and said upper portion of said tank, said separator being located between said incoming water and said heated water, said fourth means comprises a heavy weight within said separator and said slight pressure reduction comprises a reduction in static pressure attributable to said weight, said fifth means comprises a fixed total volume of said tank, and said sixth means comprises a solar heat receiver connected in series with said water passageway.

13. The apparatus of claim 9, further comprising bypass means for permitting water to flow rapidly from said first means to said second means, in the event that said second variable quantity of heated water is below a predetermined minimum quantity.

14. The apparatus of claim 9, further comprising:
   a. means for isolating said water passageway from said first means and said second means;
   b. means for draining water from said water passageway.

15. The apparatus of claim 9, further comprising an automatic timer connected to said control valve, said automatic timer having means to open said control valve at predetermined times corresponding with expected activity of said intermittent heat source, and said automatic timer having means to close said control valve at predetermined times corresponding with expected inactivity of said intermittent heat source.

16. A method for providing pressurized hot water at any time using an intermittent heat source, comprising the steps of:
   a. receiving pressurized incoming water through a cold water inlet into a first tankage volume, and accumulating a first variable quantity of said incoming water in said first tankage volume at a first total pressure above atmospheric pressure, said first total pressure being substantially similar to the total pressure of said incoming water;

b. generating freshly heated water by exposing said incoming water to said intermittent heat source when said intermittent heat source is available;

c. receiving said freshly heated water through a hot water inlet into a second tankage volume, and storing a second variable quantity of heated water in said second tankage volume at a second total pressure above atmospheric pressure, said second tankage volume being isolated from said first tankage volume, and said second tankage volume having a hot water outlet;

d. communicating passively a majority part of said first total pressure to said second variable quantity of heated water in said second tankage volume, said majority part of said first total pressure being substantially equal to said second total pressure, and said communicating being substantially continuous over wide ranges of said variable quantities;

e. maintaining passively a slight pressure reduction of said second total pressure below said first total pressure regardless of flow through said hot water outlet, said maintaining being substantially continuous over wide ranges of said variable quantities;

f. using said slight pressure reduction to cause water flow through a water passageway from said first tankage volume into said second tankage volume at intermittent times when said freshly heated water is available;

g. varying said first variable quantity oppositely to said second variable quantity over wide ranges of said variable quantities, such that said first variable quantity and said second variable quantity have a substantially constant sum;

h. using said second total pressure above atmospheric pressure to deliver hot water to recipients when needed through said hot water outlet on said second tankage volume.

17. The method of claim 16, wherein said communicating comprises communicating static pressure by permitting gases to flow between the top of said first tankage volume and the top of said second tankage volume, said maintaining comprises maintaining a reduction in elevation pressure by locating said second tankage volume at a lower elevation than said first tankage volume, and said varying comprises containing a substantially fixed quantity of compressed gas within said tankage volumes and passively transferring said compressed gas between said first tankage volume and said second tankage volume as said second variable quantity changes.

18. The method of claim 17, wherein said intermittent heat source is solar radiation, and said exposing said incoming water to said intermittent heat source comprises passing said incoming water through a solar heat receiver along said water passageway.

19. The method of claim 18, further comprising compressing atmospheric air into said tankage volumes, and venting excess compressed air from said second tankage volume.

20. The method of claim 19, wherein said compressing comprises:

a. draining water occasionally from said water passsageway and receiving fresh atmospheric air into said water passageway;

b. flowing said fresh atmospheric air into said second tankage volume by refilling said water passageway with water.

* * * * *